(12) United States Patent  
Meyer et al.

(10) Patent No.: US 9,117,481 B1  
(45) Date of Patent: Aug. 25, 2015

(54) DELAYING UNLOAD OPERATION WHEN RATE OF UNLOADS EXCEEDS A TIME VARYING UNLOAD LIMIT

(75) Inventors: Alan T. Meyer, Anaheim Hills, CA (US); Kenny T. Coker, Corona, CA (US); Daniel D. Reno, Morgan Hill, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1198 days.

(21) Appl. No.: 12/471,265

(22) Filed: May 22, 2009

(51) Int. Cl.  
*G11B 21/02* (2006.01)

(52) U.S. Cl.  
CPC ...................................... *G11B 21/02* (2013.01)

(58) Field of Classification Search  
None  
See application file for complete search history.

(56) References Cited

U.S. PATENT DOCUMENTS

| | | | |
|---|---|---|---|
| 4,885,517 A * | 12/1989 | Pennock | 318/678 |
| 5,808,438 A * | 9/1998 | Jeffrey | 318/634 |
| 6,025,968 A | 2/2000 | Albrecht | |
| 6,122,130 A | 9/2000 | Boutaghou et al. | |
| 6,246,534 B1 | 6/2001 | Gillis et al. | |
| 6,278,584 B1 | 8/2001 | Zhang et al. | |
| 6,292,333 B1 | 9/2001 | Blumentritt et al. | |
| 6,307,716 B1 | 10/2001 | Hamaguchi et al. | |
| 6,369,988 B1 | 4/2002 | Yoshida et al. | |
| 6,487,050 B1 | 11/2002 | Liu | |
| 6,507,460 B2 | 1/2003 | Fayeulle et al. | |
| 6,519,115 B1 | 2/2003 | Yaeger | |
| 6,583,960 B2 | 6/2003 | Berg | |
| 6,639,750 B1 * | 10/2003 | Hirano et al. | 360/75 |
| 7,046,474 B2 * | 5/2006 | Kuramoto et al. | 360/75 |
| 7,046,475 B2 * | 5/2006 | Hosokawa | 360/75 |
| 7,196,863 B2 * | 3/2007 | Sakamoto | 360/75 |
| 7,355,816 B1 | 4/2008 | Hiller | |
| 7,365,930 B2 | 4/2008 | Ishii et al. | |
| 7,477,468 B2 * | 1/2009 | Aoki et al. | 360/75 |
| 2001/0033460 A1 | 10/2001 | Fayeulle et al. | |

OTHER PUBLICATIONS

Kim, et al., "Ramp Load/Unload Technology in Hard Disk Drives", Hitachi Global Storage Technologies White Paper, http://www.hitachigst.com/tech/techlib.nsf/techdocs/9076679E3EE4003E86256FAB005825FB/$file/LoadUnload_white_paper_FINAL.pdf, 4 pages.

* cited by examiner

*Primary Examiner* — K. Wong

(57) ABSTRACT

A disk drive is disclosed comprising a disk, a head, and a ramp located near an outer periphery of the disk. The disk drive further comprises control circuitry operable to load the head off the ramp over the disk, receive an unload command to perform an unload operation, evaluate a number of unloads relative to an unload limit that varies over time, and when the number of unloads exceeds the unload limit, delay the unload operation.

18 Claims, 6 Drawing Sheets

DELAYING UNLOAD OPERATION WHEN RATE OF UNLOADS EXCEEDS A TIME VARYING UNLOAD LIMIT

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

When the disk drive is powered down or enters an idle mode, the head is typically unloaded onto a ramp near the outer periphery of the disk so that the disks can spin down. When the disk drive receives an access command from the host, the disk is spun up and the head is slid off the ramp (loaded over the spinning disk surface). The friction of the head as it slides along the ramp during unload/load operations can generate unwanted debris that may eventually contaminate the disk surface. In addition, friction between the head and ramp may increase with the number of unload/load operations, thereby making it difficult to reliably control the unload/load velocity of the head.

DETAILED DESCRIPTION OF EMBODIMENTS OF THE INVENTION

Figure 1A:
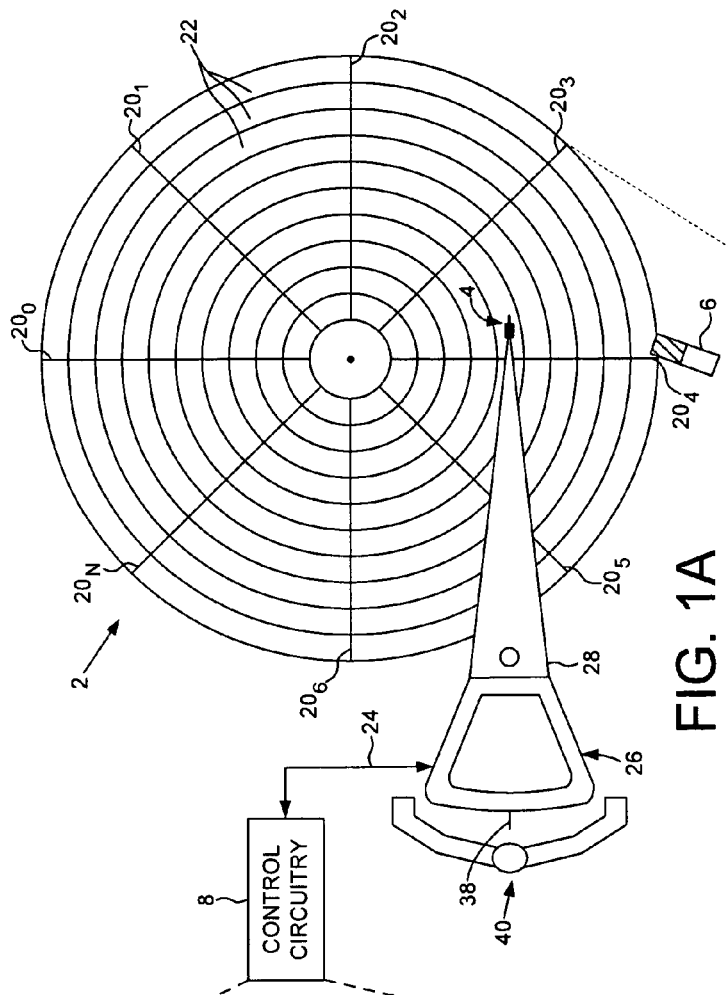
FIG. 1A shows a disk drive according to an embodiment of the present invention comprising a disk, a head, a ramp located near an outer periphery of the disk, and control circuitry.

FIG. 1A shows a disk drive according to an embodiment of the present invention comprising a disk $2$, a head $4$, and a ramp $6$ located near an outer periphery of the disk $2$. The disk drive further comprises control circuitry $8$ operable to execute the flow diagram of FIG. 1B. The head is loaded off the ramp over the disk (step $10$). When an unload command is received to perform an unload operation (step $12$), a number of unloads is evaluated relative to an unload limit that varies over time (step $14$). When the number of unloads exceeds the unload limit (step $16$), the unload operation is delayed (step $18$).

In the embodiment of FIG. 1A, the disk $2$ comprises a plurality of servo sectors $20_0$-$20_N$ that define a plurality of data tracks $22$. The control circuitry $8$ processes a read signal to demodulate the servo sectors $20_0$-$20_N$ into a position error signal (PES). The PES is filtered with a suitable compensation filter to generate a control signal $24$ applied to a voice coil $26$ of a voice coil motor (VCM) which pivots an actuator arm $28$ to position the head $4$ radially over the disk $2$ in a direction that reduces the PES.

Figure 1C:
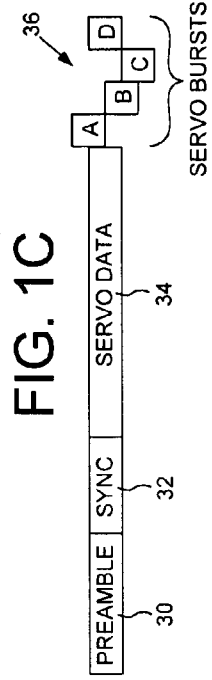
FIG. 1C shows a format of a servo sector according to an embodiment of the present invention.
Figure 1B:
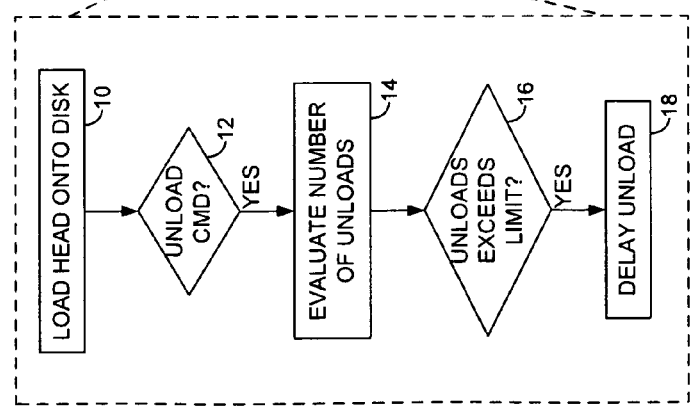
FIG. 1B is a flow diagram executed by the control circuitry according to an embodiment of the present invention wherein an unload operation is delayed when the number of unloads exceeds an unload limit that varies over time.

The servo sectors $20_0$-$20_N$ may comprise any suitable position information, and in an embodiment shown in FIG. 1C, each servo sector $20_i$ comprises a preamble $30$ for storing a periodic pattern, which allows proper gain adjustment and timing synchronization of the read signal, and a sync mark $32$ for storing a special pattern used to symbol synchronize to a servo data field $34$. The servo data field $34$ stores coarse head positioning information, such as a track address, used to position the head over a target data track during a seek operation. Each servo sector $20_i$ further comprises groups of servo bursts $36$ (e.g., A, B, C and D bursts), which comprise a number of consecutive transitions recorded at precise intervals and offsets with respect to a data track centerline.

When the disk drive is powered down or otherwise idle, the control circuitry $8$ may park the head $4$ on the ramp $6$ near the outer periphery of the disk $2$. A tang $38$ coupled to the voice coil $26$ interacts with a crash stop $40$ in order to limit the stroke of the actuator arm $28$. In addition, the actuator arm assembly typically comprises a latching mechanism, such as a magnet coupled to or embedded in the crash stop $40$ for latching to the tang $38$, or a slug embedded in the actuator arm for interacting with a magnet mounted to the base of the disk drive (e.g., a magnet of the VCM).

In one embodiment, when an idle timer exceeds a threshold, the control circuitry $8$ generates an unload command internally to unload the head $4$ onto the ramp $6$. In another embodiment, the control circuitry $8$ may receive an unload command from a host in connection with a power saving mode. In either case, the control circuitry $8$ may delay the unload operation by comparing the number of unloads previously executed to the unload limit that varies over time.

Figure 2A:
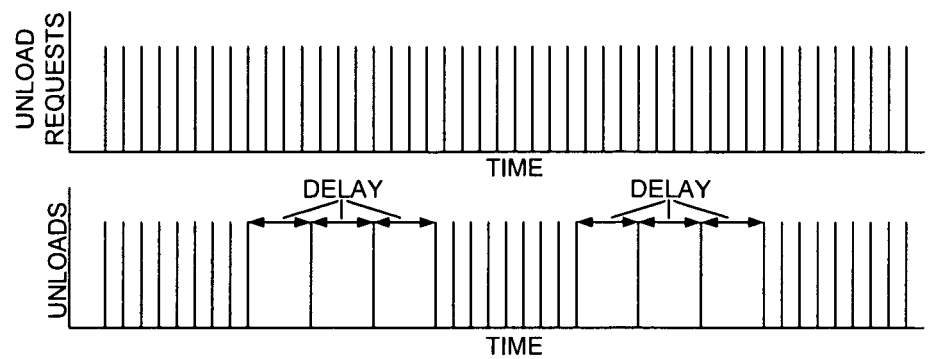
FIGS. 2A and 2B illustrate an embodiment of the present invention wherein unload operations are delayed when the number of unloads exceeds the unload limit by a delay threshold.
Figure 2B:
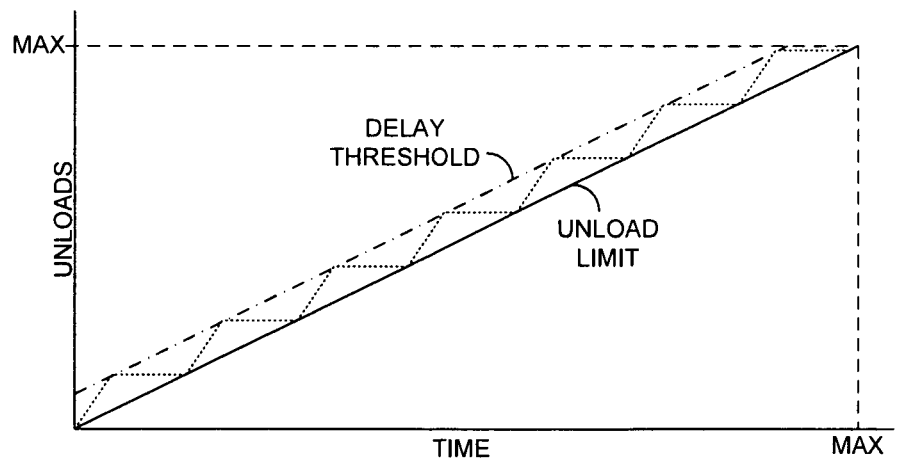

FIGS. 2A and 2B illustrate an embodiment of the present invention wherein unload operations are delayed when the number of unloads exceeds the unload limit by a delay threshold. In this embodiment, the unload limit various linearly over time wherein a maximum number of unloads are allowed over the life of the disk drive as illustrated in FIG. 2B. When the actual number of unloads exceeds the unload limit by the delay threshold, the control circuitry begins delaying the unload operations as illustrated in FIG. 2A. Also in the embodiment of FIG. 2A, the unload operations are delayed by a predetermined interval until the number of unloads falls below the unload limit. In this manner, a degree of hysteresis is introduced which prevents thrashing. Any suitable delay threshold may be employed, and in embodiments disclosed below, the delay threshold may vary relative to the unload limit.

Figure 3:
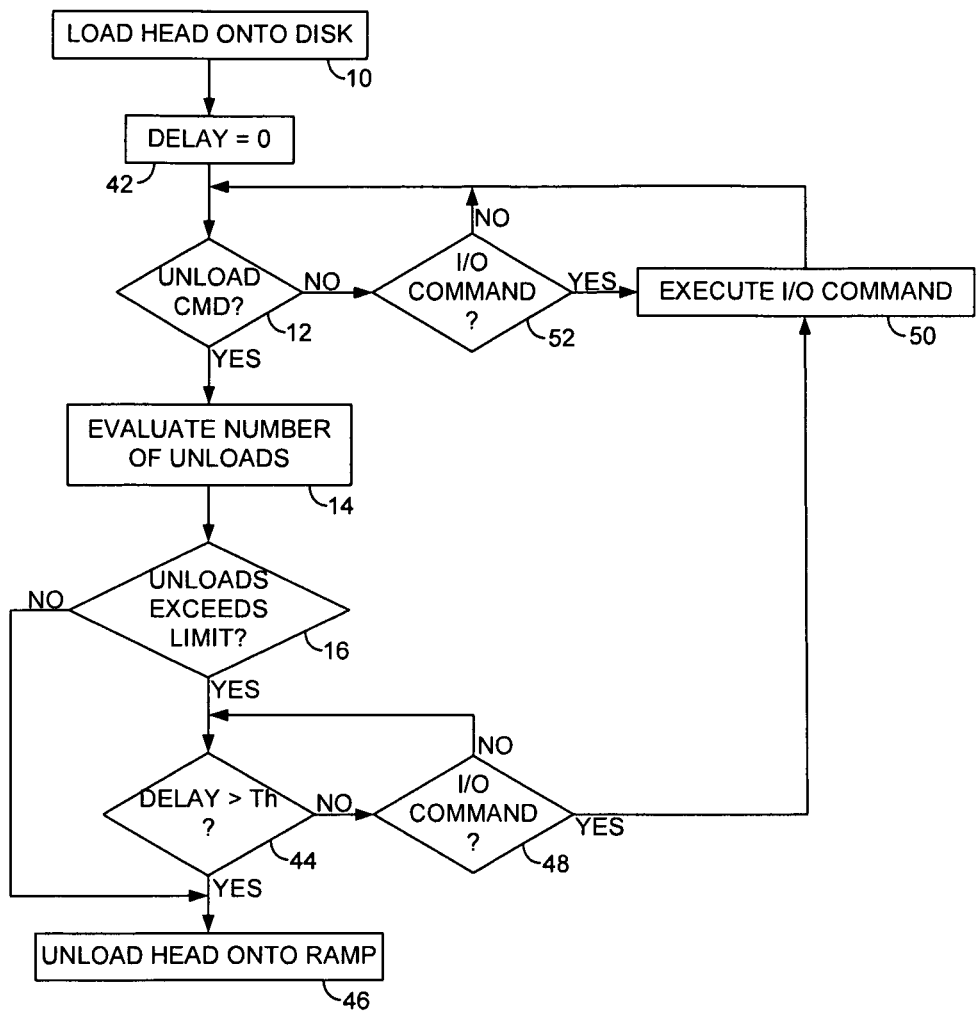
FIG. 3 is a flow diagram executed by the control circuitry according to an embodiment of the present invention wherein a delay counter incremented when delaying an unload operation is not reset when an access command is received.

FIG. 3 is a flow diagram executed by the control circuitry according to an embodiment of the present invention. After loading the head onto the disk (step $10$), a delay counter is initialized to zero (step $42$) and then incremented periodically. When an unload command is received (step $12$), and the number of unloads exceeds the unload limit (step 16), the delay counter is compared to a threshold (step 44). If the delay counter exceeds the threshold (step 44), then the unload operation is executed to unload the head onto the ramp (step 46). If when waiting for the delay counter to exceed the threshold an access command (read or write command) is received (step 48), then the access command is executed (step 50), without resetting the delay counter. After executing the access command, the control circuitry waits for a second unload command while continuing to increment the delay counter periodically (step 12). If another access command is received (step 52) while waiting for the second unload command, the access command is executed (step 50) without resetting the delay counter.

Figure 4A:
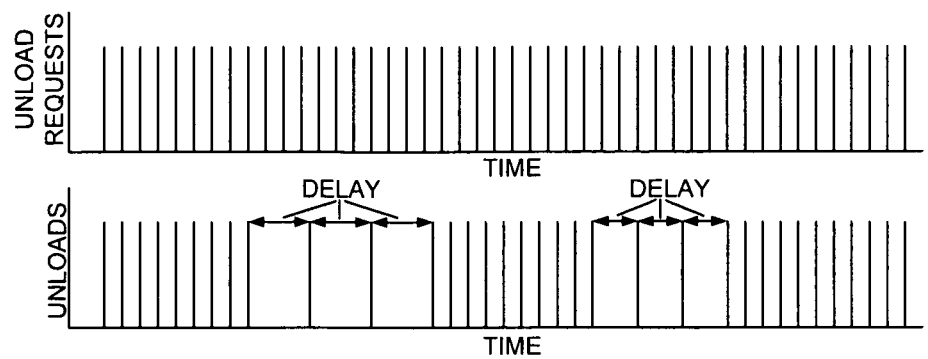
FIGS. 4A and 4B illustrate an embodiment of the present invention wherein the delay threshold may vary over time as well as the unload delay.
Figure 4B:
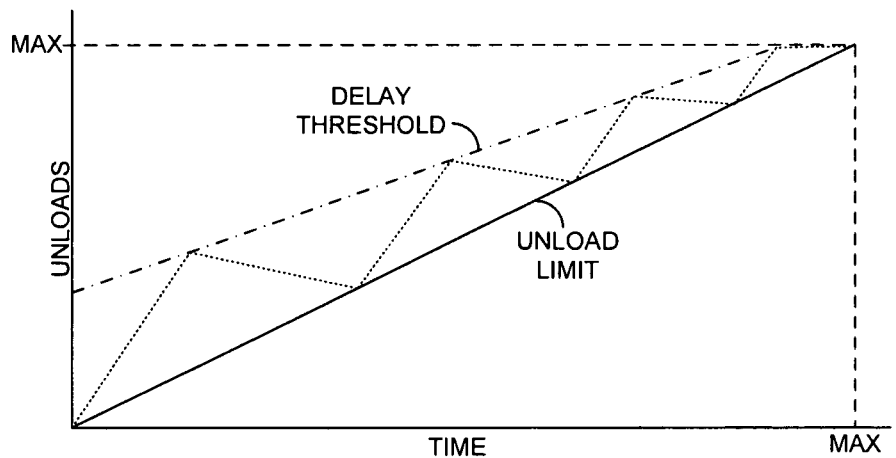

FIGS. 4A and 4B illustrate an embodiment of the present invention wherein the delay threshold and/or the unload delay may vary over time. In the example of FIG. 4B, the delay threshold decreases toward the unload limit over the life of the disk drive, and in the example of FIG. 4A, the unload delay decreases accordingly. In other embodiments, the delay threshold may vary independent of the unload delay, or the unload delay may vary independent of the delay threshold.

Figure 5A:
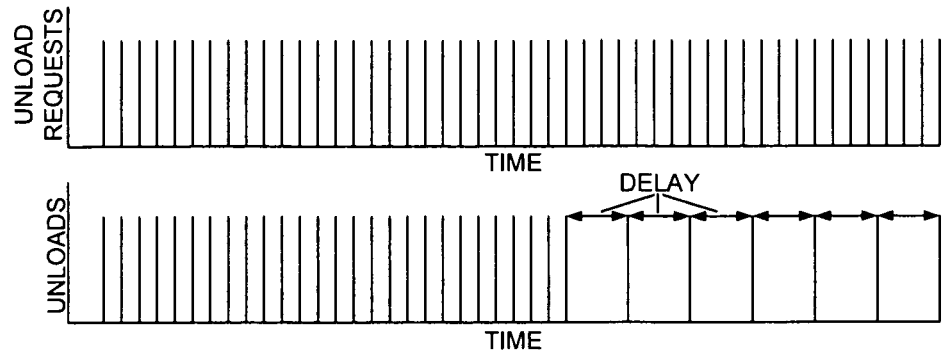
FIGS. 5A and 5B illustrate an embodiment of the present invention wherein the delay threshold is set so as to bias the unload delay toward the end of the disk drive's life.
Figure 5B:
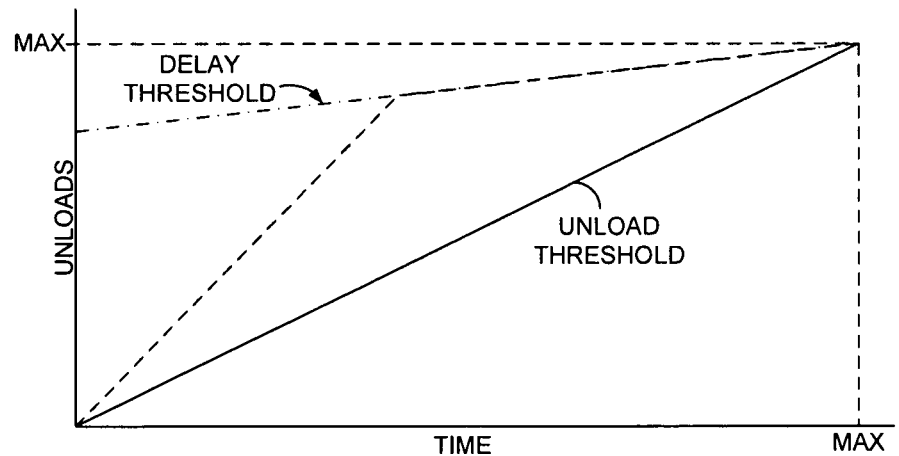

FIGS. 5A and 5B illustrate an embodiment of the present invention wherein the delay threshold is set so as to bias the unload delay toward the end of the disk drive's life. In this manner, the unload operations will not be delayed for a significant amount of time at the beginning of the disk drive's life when, for example, particle contamination may be least likely. When the number of unloads reaches the delay threshold, the unload operations may be delayed with a varying amount of delay so that the number of unloads substantially tracks the delay threshold toward the maximum number of unloads as illustrated in FIG. 5B.

Figure 6A:
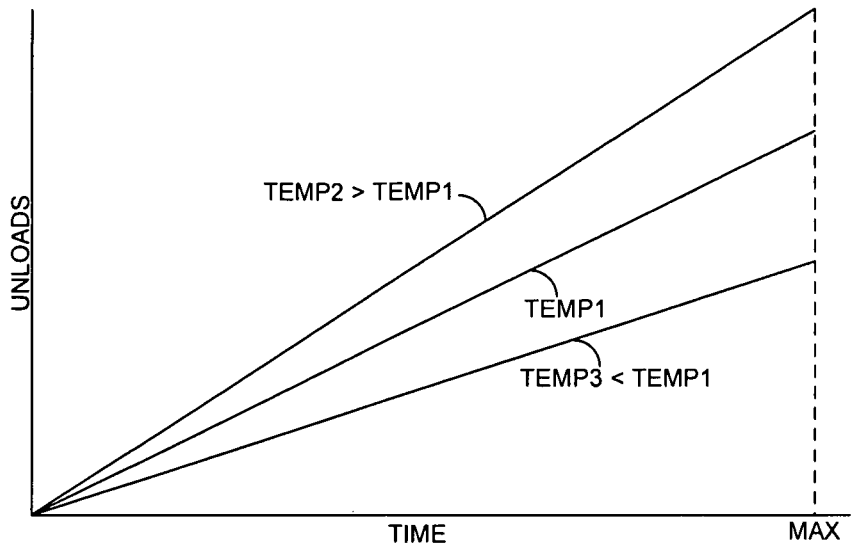
FIGS. 6A and 6B illustrate an embodiment of the present invention wherein the unload limit is adjusted in response to the ambient temperature of the disk drive.
Figure 6B:
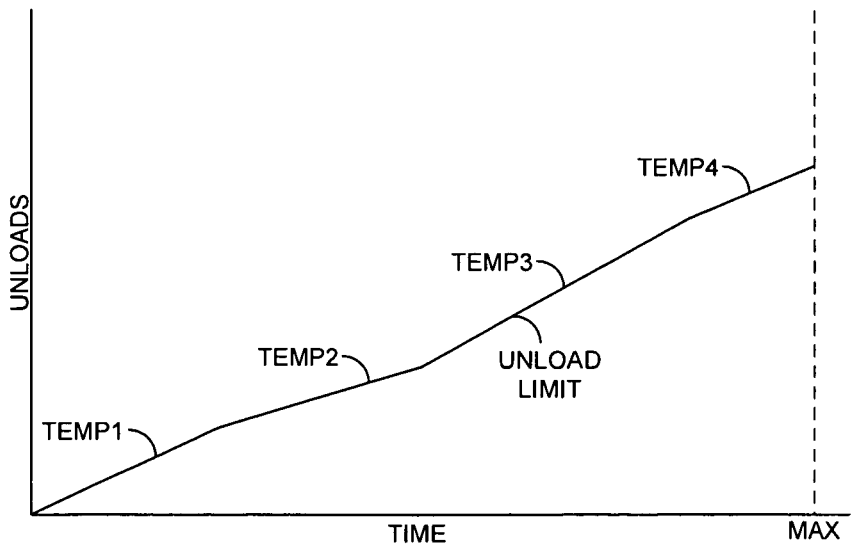

FIGS. 6A and 6B illustrate an embodiment of the present invention wherein the unload limit is adjusted in response to the ambient temperature of the disk drive. In the example of FIG. 6A, the unload limit may increase with the ambient temperature since the maximum number of unloads increases with ambient temperature. In the embodiment of FIG. 6B, the unload limit may be adjusted over the life of the disk drive relative to ambient temperature fluctuations such that the slope of the unload limit changes with the ambient temperature. The slope of the unload limit may be updated at any suitable interval, and in one embodiment, the slope of the unload limit is adjusted relative to a running average of the ambient temperature calculated over any suitable window of time.

In one embodiment, an emergency unload command may override the delayed unload operation to prevent damage to the disk drive. For example, if excessive shocks or vibrations to the disk drive are detected, or if a drop condition is detected, or if a power failure condition is detected, an emergency unload command may be generated (e.g., by a host or by the control circuitry internal to the disk drive) which overrides the delayed unload so that the head is immediately unloaded onto the ramp. In other embodiments, an unload command may be delayed only if generated internally (e.g., in response to an idle timer) whereas an unload command generated by a host (e.g., when entering a sleep mode) may be executed immediately.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head;
   a ramp located near an outer periphery of the disk; and
   control circuitry operable to:
      load the head off the ramp over the disk;
      receive a first unload command to perform an unload operation;
      evaluate a number of unloads relative to an unload limit that varies over time; and
      when the number of unloads exceeds the unload limit, delay the unload operation.

2. The disk drive as recited in claim 1, wherein the control circuitry is further operable to:
   increment a delay counter when delaying the first unload operation;
   receive an access command when delaying the first unload operation;
   execute the access command without resetting the delay counter, and receive a second unload command after executing the access command; and
   when the delay counter exceeds a threshold, unload the head onto the ramp.

3. The disk drive as recited in claim 1, wherein the control circuitry is further operable to delay the unload operation for a predetermined interval.

4. The disk drive as recited in claim 3, wherein the control circuitry is further operable to vary the predetermined interval.

5. The disk drive as recited in claim 1, wherein the control circuitry is further operable to delay the unload when the number of unloads exceeds the unload limit by a delay threshold.

6. The disk drive as recited in claim 5, wherein the control circuitry is further operable to delay the unloads until the number of unloads falls below the unload limit.

7. The disk drive as recited in claim 5, wherein the control circuitry is further operable to adjust the delay threshold over a life of the disk drive.

8. The disk drive as recited in claim 5, wherein the control circuitry is further operable to delay the unload operation over a varying interval relative to the adjusted delay threshold.

9. The disk drive as recited in claim 1, wherein the control circuitry is further operable to:
   measure an ambient temperature of the disk drive; and
   adjust the unload limit in response to the ambient temperature.

10. A method of operating a disk drive, the disk drive comprising a disk, a head, and a ramp located near an outer periphery of the disk, the method comprising:
   loading the head off the ramp over the disk;
   receiving a first unload command to perform an unload operation;
   evaluating a number of unloads relative to an unload limit that varies over time; and
   when the number of unloads exceeds the unload limit, delaying the unload operation.

11. The method as recited in claim 10, further comprising:
   incrementing a delay counter when delaying the first unload operation;
   receiving an access command when delaying the first unload operation;
   executing the access command without resetting the delay counter, and receiving a second unload command after executing the access command; and
   when the delay counter exceeds a threshold, unloading the head onto the ramp.

12. The method as recited in claim 10, further comprising delaying the unload operation for a predetermined interval.

13. The method as recited in claim 12, further comprising varying the predetermined interval.

14. The method as recited in claim 10, further comprising delaying the unload when the number of unloads exceeds the unload limit by a delay threshold.

15. The method as recited in claim 14, further comprising delaying the unloads until the number of unloads falls below the unload limit.

16. The method as recited in claim 14, further comprising adjusting the delay threshold over a life of the disk drive.

17. The method as recited in claim 14, further comprising delaying the unload operation over a varying interval relative to the adjusted delay threshold.

18. The method as recited in claim 10, further comprising:
   measuring an ambient temperature of the disk drive; and
   adjusting the unload limit in response to the ambient temperature.

* * * * *